United States Patent
Zhang et al.

(10) Patent No.: US 7,486,835 B2
(45) Date of Patent: Feb. 3, 2009

(54) SYSTEM AND METHOD FOR ENHANCING AN IMAGE

(75) Inventors: Yan Zhang, Kokomo, IN (US); Ronald M. Taylor, Greentown, IN (US); Robert A. Perisho, Jr., Russiaville, IN (US)

(73) Assignee: Delphi Technologies, Inc., Troy, MI (US)

( * ) Notice: Subject to any disclaimer, the term of this patent is extended or adjusted under 35 U.S.C. 154(b) by 532 days.

(21) Appl. No.: 11/082,546

(22) Filed: Mar. 17, 2005

(65) Prior Publication Data

US 2006/0210190 A1  Sep. 21, 2006

(51) Int. Cl.
G06K 9/00 (2006.01)
G06K 9/34 (2006.01)

(52) U.S. Cl. .................................. 382/274; 382/104
(58) Field of Classification Search .............. 382/104, 382/153, 260, 274; 348/31
See application file for complete search history.

(56) References Cited

U.S. PATENT DOCUMENTS

| | | | |
|---|---|---|---|
| 4,302,672 A | 11/1981 | Kato et al. | |
| 6,059,729 A * | 5/2000 | Stonger | 600/443 |
| 6,205,257 B1 | 3/2001 | Eschbach | |
| 6,462,768 B1 * | 10/2002 | Oakley | 348/31 |
| 6,738,161 B1 * | 5/2004 | Moriwaki | 358/1.9 |
| 6,771,836 B2 * | 8/2004 | Lawton | 382/260 |
| 2003/0002736 A1 * | 1/2003 | Maruoka et al. | 382/168 |
| 2003/0161549 A1 * | 8/2003 | Lei et al. | 382/274 |
| 2004/0136605 A1 * | 7/2004 | Seger et al. | 382/274 |
| 2004/0213478 A1 * | 10/2004 | Chesnokov | 382/260 |
| 2005/0157939 A1 * | 7/2005 | Arsenault et al. | 382/260 |

FOREIGN PATENT DOCUMENTS

| | | |
|---|---|---|
| EP | 0996002 | 4/2000 |
| EP | 1022679 A2 * | 7/2000 |

OTHER PUBLICATIONS

Zhang Yu, New Image enhancement algorithm for night vision, 1999, IEEE, 0-7803-5467-2, 201-203.*
EP Search Report Dated Jul. 7, 2006.
Lim Y W et al.: "On the Color Image Segmentation Algorithm Based on the Thresholding and the Fuzzy C-Means Techniques" Pattern Recognition, Elsevier<Kidlington, GB, vol. 23, No. 9, 1990, pp. 935-952, XP000159058 ISSN: 0031-3203 *figure 2; sequence 2.1*.
Communication from the European Patent Office for European Application No. 06075529.5—2218, Apr. 19, 2007 (14 pages).

* cited by examiner

Primary Examiner—Jingge Wu
Assistant Examiner—Jayesh A Patel
(74) Attorney, Agent, or Firm—Jimmy L. Funke

(57) ABSTRACT

A system and method for enhancing the contrast within an image. An enhanced image can be generated in a real-time or substantially real-time manner from an initial image. The pixel values of the initial image can be used to populate a histogram or otherwise serve as the basis for subsequent processing. A valley can be identified within the range of pixel values for use as a stretch metric used by a stretch heuristic to expand the contrast of the pixel values in the initial image by expanding the range of pixel values associated with the pixels in the histogram. In some embodiments, the initial image is first divided into image regions that are each associated with individualized processing. A bilinear interpolation step can then be performed to smooth the integrated image after the individualized processing is used to stretch the pixels within the individual image regions.

11 Claims, 7 Drawing Sheets

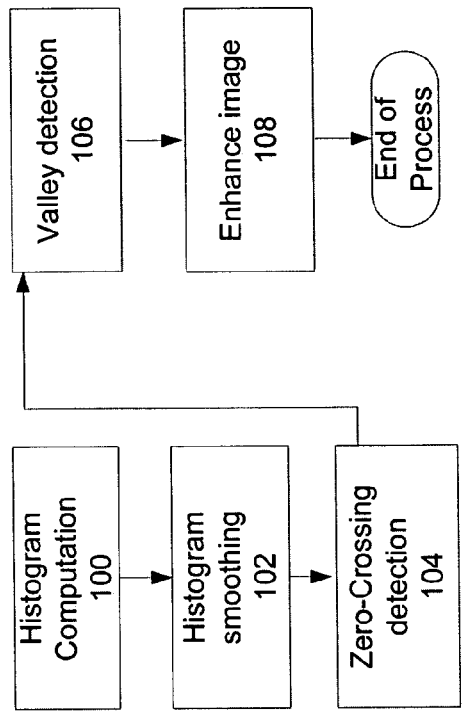
$$C = \sqrt{\frac{\sum_{x,y \in R}(G(x,y)-m)^2}{N-1}}$$
Figure 3
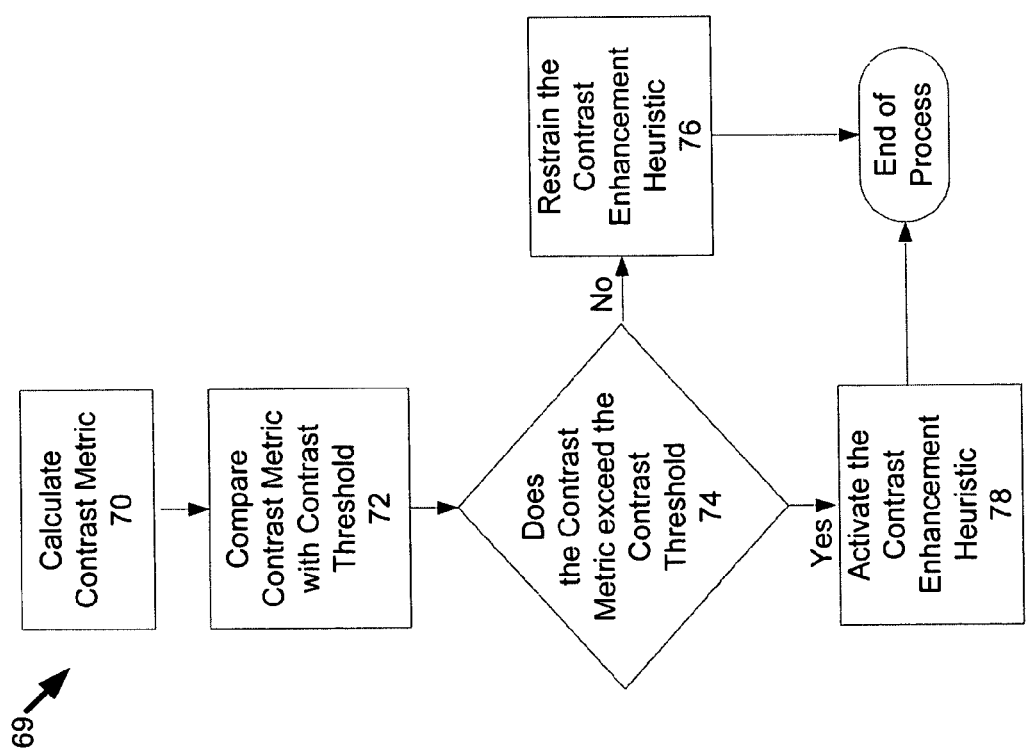
Figure 4
Figure 2

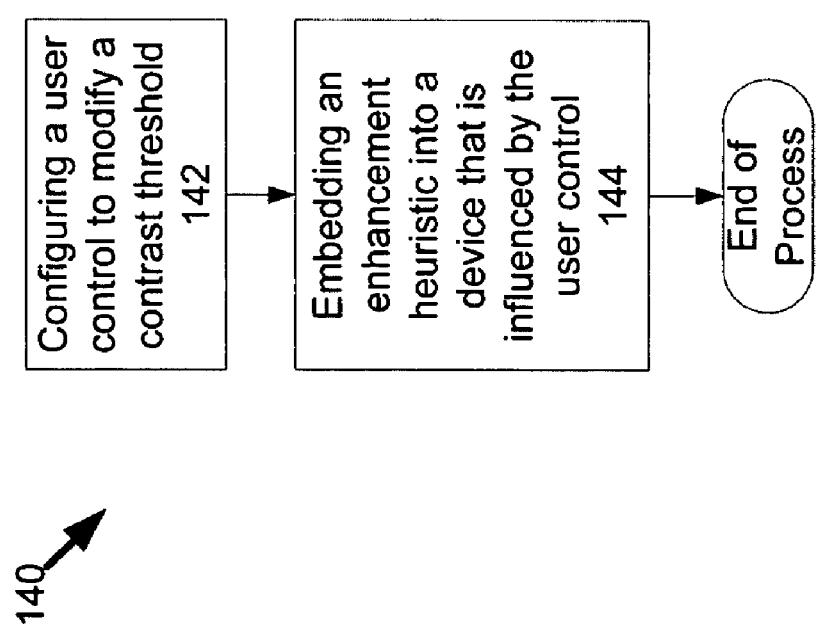

SYSTEM AND METHOD FOR ENHANCING AN IMAGE

BACKGROUND OF THE INVENTION

The invention relates generally to systems and methods for enhancing images (collectively the "system"). More specifically, the invention relates to systems for enhancing the contrast within an image.

There are many contexts in which human beings and/or machines are impeded by low-contrast images.

The ability of a human being to safely operate a vehicle or other type of machine can be substantially impeded by a relatively dark environment. Night time driving is substantially more difficult and dangerous than day time driving. Only 28% of driving occurs at night. However, night time driving is responsible for over 62% of pedestrian fatalities. Standard headlights on a "low beam" typically illuminate approximately 60 meters ahead of the vehicle. At a speed of 60 miles per hour, a driver has approximately three seconds to react to a visible obstacle. Further complicating the visibility of the driver is the glare of headlights from one or more vehicles traveling in one or more directions.

There are many other contexts in which human beings are impeded by poor visibility in dark (e.g. low contrast) environments. Whether the task is navigation, the operation of equipment, or simply observation, human beings can be adversely impacted by an inability to view "contrast" in their surroundings.

Difficulties associated with low contrast environments are not limited to human beings. Sensors and the various machines that rely on those sensors can also be negatively impacted by relatively dark environments. There are numerous examples in the known art where automated processing is performed in response to information obtained from various image-based sensors. Security applications, industrial robots, automated vehicles, military devices, and other applications involving automated machines utilizing images captured from various sensors are often impeded by low contrast/poor visibility environments.

SUMMARY OF THE INVENTION

The system uses a computer to create an enhanced image from an initial image.

In some embodiments, a contrast metric can be generated using the pixel values from the initial image to determine whether or not enhancement would be desirable with respect to a particular image.

In some embodiments, the different pixel values of the initial image are placed on a histogram to determine whether or not a particular pixel value should be changed to a brighter value, changed to a darker value, or left unchanged.

The present invention will be more fully understood upon reading the following detailed description in conjunction with the accompanying drawings.

BRIEF DESCRIPTION OF THE DRAWINGS

FIG. 2 is a flow chart diagram illustrating an example of an enhancement invocation heuristic.

FIG. 3 is an equation illustrating an example of a contrast metric.

FIG. 4 is a flow chart diagram illustrating an example of an enhancement heuristic.

FIG. 10 is a flow chart diagram illustrating an example of a process for implementing the system.

DETAILED DESCRIPTION

I. Overview

The invention relates generally to systems and methods for enhancing images (collectively "enhancement systems" or simply the "system"). More specifically, the invention relates to systems for enhancing the contrast within an image. The system can be used in a wide variety of different contexts and operating environments. The system can be embodied in a wide variety of different components and architectures.

The system can be used to facilitate, support, or otherwise assist in the operation of:
 a vehicle by a human being;
 an automated vehicle guided by an image captured from a sensor;
 night vision goggles, cameras, and other "night vision" devices;
 security cameras;
 motion detectors;
 vehicle navigation and operation applications;
 camping equipment;
 security applications; and
 any other application or function in which an enhanced image is useful.

A variety of ancillary devices can be used to support the functionality of the system. For example, in the context of a system providing "night vision" to the driver of a vehicle, it might be desirable to use a CMOS camera along with an infrared illuminator to achieve high night time visibility as far as 150 m ahead of the vehicle. Different embodiments of the system can use different sensors for capturing images. Some embodiments of the system may use multiple sensors to capture multiple images in a simultaneous or substantially simultaneous manner. Some embodiments of the system will incorporate illumination assistance devices such as an infrared illuminator, while other embodiments will not.

II. Introduction of Elements

Figure 1:
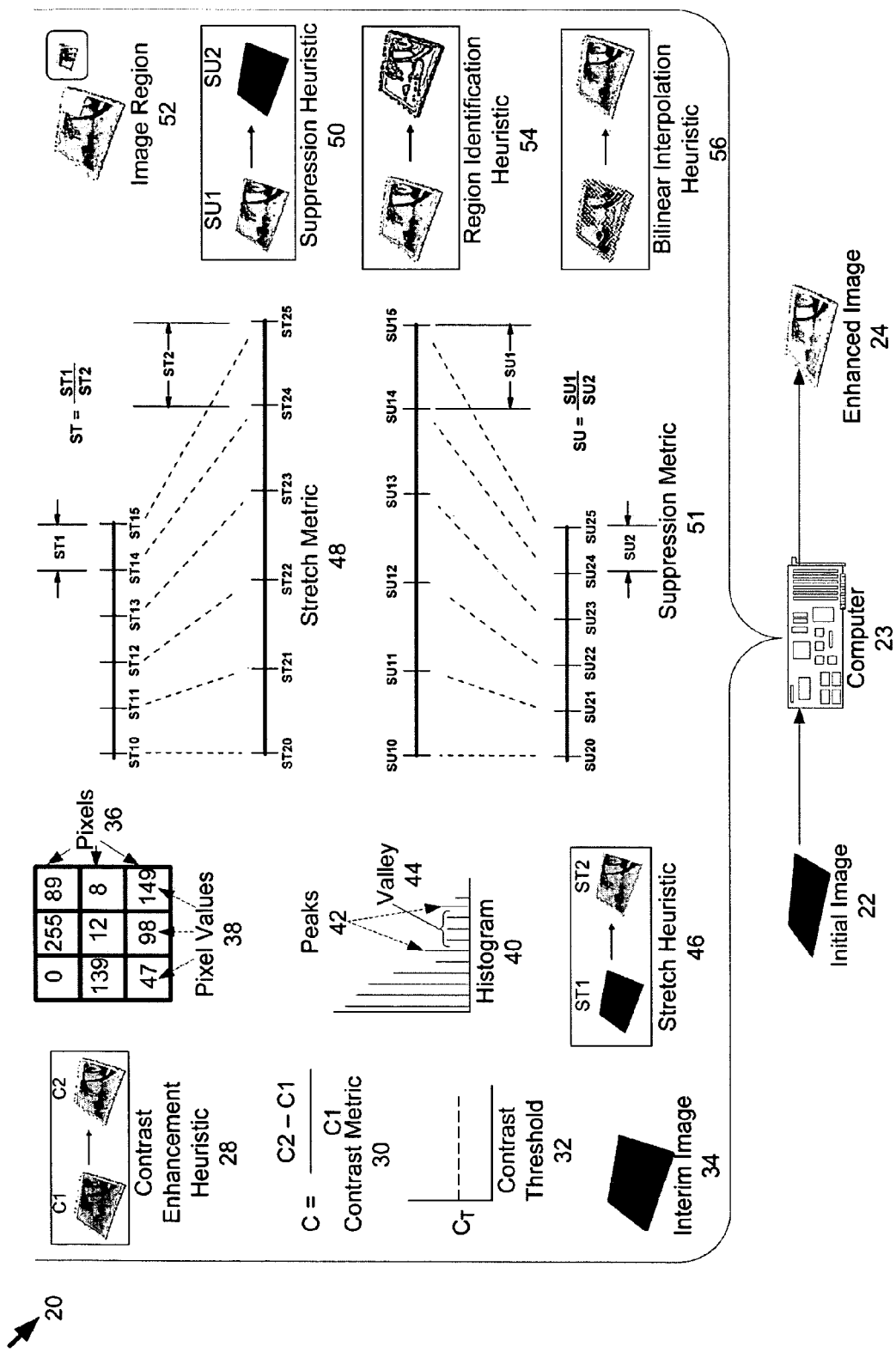
FIG. 1 is a block diagram illustrating an example of different elements that can influence the processing performed by a computer to create an enhanced image from an initial image.

FIG. 1 is a block diagram illustrating an example of a system 20. The system 20 is used to enhance images, e.g. create an enhanced image 24 from an initial image 22. Different embodiments of the system 20 can include different elements, and the elements themselves can vary from embodiment to embodiment.

A. Initial Image

An initial image 22 can also be referred to as a raw image, a non-enhanced image, an un-enhanced image, or a captured image. The initial image 22 is the image that would need to be relied upon if the system 20 were not present to enhance the contrast within the initial image 22. In a night time driving embodiment of the system 20, the initial image 22 is the driver's unaided view of the road as captured by a camera or other form of sensor in or on the vehicle.

In many embodiments, the initial image 22 will be a digital image captured by a sensor in a real-time or substantially real-time manner. In other embodiments, the initial image 22 can be in an analog format, subject to a conversion process in which a digital version of the initial image 22 is created for use by the system 20.

B. Computer

A computer 23 is any device or combination of devices capable of implementing the processing requirements of the system 20 to create enhanced images 24 from initial images 22. In a night time driving embodiment of the system 20, the computer 23 will typically be embedded into the vehicle. In a night vision goggle embodiment of the system 20, the computer 23 could be located within the goggles themselves, or the computer 23 could be configured to communicate with the goggles through a wire or some type of wireless connection. With respect to embodiments of the system 20 that involve automated devices utilizing sensor images, the computer 23 could be located within the sensor, within the automated device, or at some third location, depending on the desired operating environment and processing goals of the system 20.

In many embodiments of the system 20, the system 20 is configured to create enhanced images 24 from initial images 22 in a real-time or substantially real-time manner. In other embodiments, the speed of the system 20 is not as important, and processing can be performed in a batch mode.

C. Enhanced Image

An enhanced image 24 is an initial image 22 that is enhanced by the operations of the computer 23. The system 20 can be used to enhance images in one or more ways. Certain aspects or portions of the image (e.g. pixels) can be brightened to enhance the contrast within the image. Certain aspects or portions of the image (e.g. pixels) can be darkened to reduce the glare within the image.

The enhanced image 24 is typically a digital image, although in certain embodiments it could be an analog image. The format of the enhanced image 24 and other attributes of the enhanced image 24 can be influenced by the ways in which the enhanced image 24 is to be used by the application invoking the functionality of the system 20.

D. Contrast Enhancement Heuristic

A contrast enhancement heuristic 28 is the set of instructions implemented by the computer 23 to obtain the functionality of the system 20. The contrast enhancement heuristic 28 can also be referred to as an enhancement heuristic. The contrast enhancement heuristic 28 is typically implemented in the format of software for the computer 23, but the contrast enhancement heuristic 28 can also be "programmed" or "hard coded" into the computer 23 exclusively through hardware components and configurations.

E. Contrast Metric

A contrast metric 30 is a metric that relates to the element of "contrast" within the initial image 22. In some embodiments, the contrast metric 30 is used to determine the desirability of the system 20 performing the contrast enhancement heuristic 28 to create an enhanced image 24 from an initial image 22. For example, the system 20 can be configured to selectively invoke the contrast enhancement heuristic 28 depending on the contrast metric 30. In some embodiments of the system 20, the contrast metric 30 is compared to a contrast threshold 32 (discussed below) to determine whether or not the contrast enhancement heuristic 28 should be invoked. Some embodiments of the system 20 will not use a contrast metric 30.

An example of a mathematical equation that can be used to calculate a contrast metric 30 is provided in FIG. 3 and discussed in greater detail below. Different embodiments of the system 20 can invoke different contrast metrics 30. As illustrated in FIG. 1, the contrast metric 30 can be a comparative measure.

F. Contrast Threshold

A contrast threshold 32 is a value used by the system 20 for the purposes of comparison with the contrast threshold 32. Some embodiments of the system 20 will not include a contrast threshold 32. In some embodiments of the system 20, the contrast threshold 32 can be adjusted by the user of the system 20. For example, a driver utilizing the system 20 to provide "night vision" could be allowed to adjust the desired contrast in the image outputted by the system 20. Allowing the driver to modify the contrast threshold 32 could achieve such flexibility on the part of the system 20.

The appropriate contrast threshold 32 for a particular embodiment of the system 20 can be influenced by the availability of an illumination assistance device, such as an infrared illuminator as well as the type of sensor or camera used to capture the initial image 22. In some embodiments of the system 20, different contrast thresholds 32 can be applied in different circumstances. For example, different contrast thresholds 32 could be applied to interior and exterior images. In some embodiments of the system, different contrast thresholds 32 can be applied to different regions of the image. For example, different contrast thresholds 32 could be applied to the center portion of the image compared to the perimeter image regions. There can be many contrast thresholds 32 for a single image G. Interim Images The system 20 can utilize one or more interim images 34 in the process of creating an enhanced image 24 from the initial image 22. Different embodiments of the system 20 can involve a wide variety of different interim image processing steps. Interim images 34 can also be referred to as "work in process" images 34.

H. Pixels and Pixel Values

Initial images 22, interim images 34, and enhanced images 24 processed by the system 20 can be divided up into individual pixels 36. The number of pixels 36 in an image determines the potential quality and level of detail that the image can convey. For example, an image that is 1000 pixels high and 800 pixels wide is capable of greater resolution than an image that is only 500 pixels high and 400 pixels wide. The sensor used to capture the initial image 22 will typically be the limiting factor with respect to the number of pixels within the initial image 22, and ultimately, the number of pixels within the enhanced image 24. For example, the type of camera used to capture the initial image 22 can determine whether the initial image 22 will have a resolution of VGA (or higher).

Each pixel 36 can be associated with a pixel value 38. A typical pixel value 38 for an 8-bit image sensor is a number between 0 and 255, with 0 representing the lowest level of brightness and 255 representing the highest measure of brightness. Different ranges of pixel values 38 can be incorporated into different embodiments of the system 20. For example, a 12-bit image sensor will have pixel values 38 between 0 and 4095.

I. Histogram

A histogram 40 is a type of graph or diagram. With respect to the functionality of the system 20, the histogram 40 identifies the number of pixels 36 associated with a particular pixel value 38. A wide variety of different histograms 40 can be used to facilitate the pixel-related processing of the contrast enhancement heuristic 28.

The system 20 does not need to create or process histograms for the system 20 to function. Histograms 40 are merely one way in which to express relationships and processing based on pixel values 38. The system 20 can apply a wide variety of statistical processes and techniques to the pixel values 36 used by the system 20. Some of those statistical metrics and heuristics can be characterized as histogram-based or histogram-related, while others may best be characterized as other statistic processes and techniques known in the art.

J. Peaks and Valleys

Histograms 40 used by the system 20 can include potentially any attribute that is associated with histograms 40 in the existing art. Peaks 42 and valleys 44 are examples of generally known attributes of histograms 40 that can be associated with specific meanings and impacts within the contrast enhancement heuristics 28 that can be performed by the system 20. Peaks 42 and valleys 44 are discussed in greater detail below.

K Stretch Heuristics and Stretch Metrics

A stretch heuristic 46 is the process by which the system 20 manipulates, influences, or "stretches" a range of pixel values 38 to enhance the "contrast" of those pixels 36, enhancing the contrast in the image as a whole. The system 20 can include a wide variety of different stretch heuristics 46, sometimes applying multiple stretch heuristics 46 to a single image. One category of examples is illustrated in FIG. 1. Stretch heuristics are discussed in greater detail below.

A single stretch heuristic 46 will often generate multiple stretch metrics 48. Each pixel 36 subjected to the processing of the stretch heuristic 46 can be associated with a stretch metric 48 that is associated with the particular pixel 36. The stretch metric 48 can also be referred to as an "intensity" value.

Dark (e.g. low-contrast) images are typically made up of pixels 36 with pixel values 38 of a relatively small range (e.g. 0 through 50 even though pixel values 38 can range from 0 through 255). The stretch heuristic 46 is the process by which the range of pixel values 38 are stretched out to cover the entire range of potential pixel values 38. The stretch metric 48 is the measure by which the range of initial pixels 36 are stretched.

I. Suppression Heuristics and Suppression Metrics

In addition to enhancing the differences between pixels 36 (e.g. increasing or "stretching" the contrast between pixel values 38), some embodiments of the system 20 can also be configured to suppress or reduce the contrast between certain pixel values 38. This is done to reduce the glare within the image. For example, in a night time driving embodiment of the system 20, the glare from the headlights can manifest itself as extremely high pixel values 38 relative to the other pixels 36 in the initial image 22. A suppression heuristic 50 can be used to reduce the contrast of those pixel values 38.

A suppression metric 51 represents the degree of magnitude by which a particular pixel value 38 is suppressed. In some respects, the suppression heuristics 50/metrics 51 can be thought of as mirror images of the stretch heuristics 46/metrics 48. FIG. 1 illustrates one category of examples relating to suppression heuristics 50 and metrics 51. Suppression heuristics 50 and suppression metrics 51 are discussed in greater detail below.

J. Identification Heuristics and Image Regions

In some embodiments of the system 20, the initial image 22 is "broken down" into image regions 52 before any enhancement processing is performed on the image. In many region-based embodiments, each image region 52 is processed independently of the other regions 52. For example, with respect to the histogram 40 processing discussed below, each image region 52 could have its own histogram 40.

The system 20 can use a variety of region identification heuristics 54 known in the art to identify image regions 52 within the initial image 22. Depending on the purpose and operating environment of the application being supported by the system 20, the system 20 can be configured to generate relatively more or relatively fewer image regions 52 from the initial image 22. Multi-region processing is discussed in greater detail below.

K. Bilinear Interpolation Heuristic

A bilinear interpolation heuristic 56 is a process that can be used in multi-region embodiments of the system 20 to "smooth" the enhanced image after the various enhanced image regions 52 are reassembled into a single image. The bilinear interpolation heuristic 56 is not necessary in all embodiments of the system 20. The bilinear interpolation heuristic 56 is discussed in greater detail below.

III. Activation of the Enhancement Process

FIG. 2 is a flow chart diagram illustrating an example of an enhancement invocation heuristic 69, the process by which a system 20 can activate the process of enhancing initial images 22. The invocation heuristic 69 can also be referred to as an activation heuristic or an initiation heuristic. In some embodiments of the system 20, the enhancement heuristic 28 is automatically invoked on a continuous or substantially continuous basis. In other embodiments, the enhancement heuristic 28 is only invoked when the initial image 22 is not "satisfactory" to the system 20, one or more applications making use of the system 20, or to potentially one or more end users of the system 20.

At 70, the contrast metric 30 is generated by the system 20. One example of a process for generating a contrast metric 30 is displayed in FIG. 3. In FIG. 3, an example of a global (e.g. image-wide) contrast equation 80 is displayed. G(x,y) is the pixel value 38 associated with each pixel 36 in the initial image 22, e.g. all (x,y) values in R, the range of (x,y) values in the initial image 22. The variable m represents the mean pixel value 38. The variable N represents the total number of pixels 36 in the initial image 22. The equation 80 in FIG. 3 is used to estimate or influence the normalized standard deviation of gray or intensity levels.

Returning to 72 of FIG. 2, the contrast metric 30 is compared to the contrast threshold 32. In many embodiments, the end user of the system 20 can adjust the contrast threshold 32 of the system 20. In other embodiments, the contrast threshold 32 is predefined before the system 20 is implemented, although the contrast threshold 32 can still be changed by non-end users after implementation if such adjustments are desired. In driver assistance embodiments of the system 20 with predefined contrast thresholds 32, a contrast threshold 32 of 60 (assuming a pixel value 38 range between 0 and 255 gray or intensity levels) can be desirable. Any potential pixel value 38 (typically a value between 0 and 255 gray or intensity levels) can potentially serve as a useful contrast threshold 32.

At 74, the system 20 determines whether or not the contrast metric 30 exceeds the contrast threshold 32. If the contrast metric 30 is higher than the contrast threshold 32, the system 20 can be configured to restrain, impede, or otherwise not activate the contrast enhancement heuristic 28 at 76. If the contrast metric is lower than the contrast threshold, the system 20 can be configured to invoke, initiate, or otherwise activate the contrast enhancement heuristic 28 at 78.

In some embodiments of the system 20, the contrast threshold 32 must exceed the contrast metric 30 to activate the contrast enhancement heuristic 28. In other embodiments, the contrast enhancement heuristic 28 is activated so long as the contrast metric 30 is less than or equal to the contrast threshold 32.

The processing loop illustrated in FIG. 2 can be configured to continuously repeat, or it can be configured to be triggered by specific triggering events.

By allowing the enhancement heuristic 28 to be turned on and off, the system 20 can be used to automatically transition from the display of images captured in low-contrast environments to the display of images captured in high-contrast environments.

IV. Process Flow View of an Activated Enhancement Heuristic

The enhancement heuristic 28 can vary widely in different embodiments of the system 20. FIG. 4 provides an example of an activated contrast enhancement heuristic 99 that can enhance images in a real-time or substantially real-time manner. The activated contrast heuristic 99 displayed in FIG. 4 presumes that night vision and other low contrast initial images 22 are associated with bimodal histograms (e.g. bimodal histogram embodiments). Bimodal histograms are discussed in greater detail below. The system 20 is not limited to the use of bimodal histograms 44. The image regions 52 may also be associated with different bimodal histogram embodiments. Different types of histogram-based processing and presumptions can be incorporated into the system 20.

A. Histogram Computation

A histogram computation is performed at 100.

Figure 5:
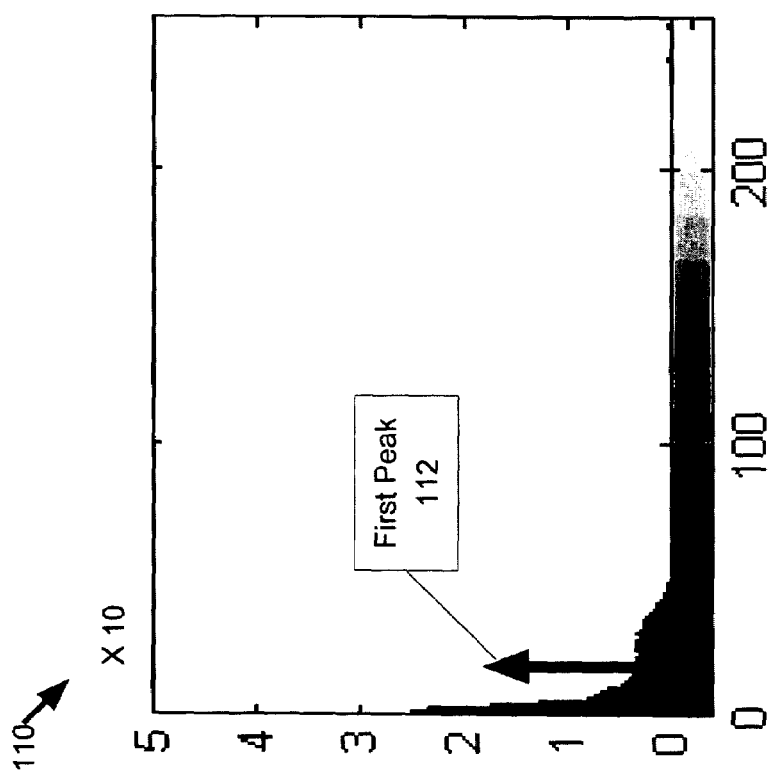
FIG. 5 is a histogram diagram illustrating an example of an initial histogram populated with pixel values from an initial image.

FIG. 5 is a histogram diagram illustrating an example of an initial histogram 110 populated with pixel values 38 from an initial image 22. The horizontal (x) axis represents the pixel values 38 associated with pixels 36 in the initial image 22. The vertical (y) axis represents the number of pixels 36 that are associated with a particular pixel value 38. As is illustrated in FIG. 5, pixel values 38 range from 0 through 255 gray or intensity levels. A first peak 112 in the histogram 110 can be seen in FIG. 5.

Figure 6:
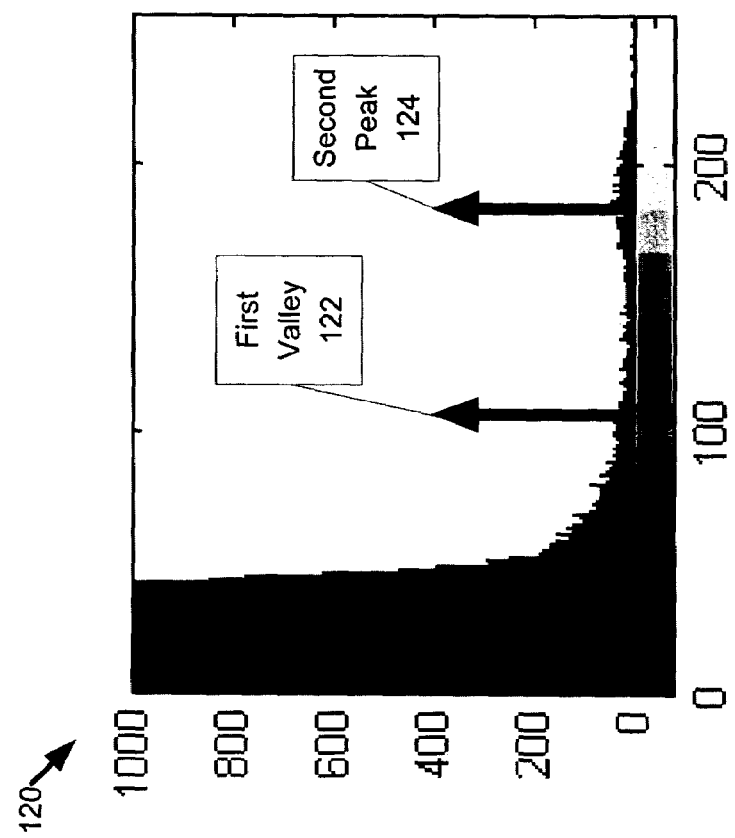
FIG. 6 is a zoomed view of a histogram diagram illustrating an example of an initial histogram populated with pixel values from an initial image.

FIG. 6 is a zoomed, close-up, or amplified view (collectively amplified view 120) of the histogram diagram 110 in FIG. 5. In the amplified view, a second peak 124 is visible. In the amplified view, a valley (e.g. first valley) 122 between the first peak 112 and second peak 124 is visible in the diagram. The structure of an initial histogram with two peaks 42 surrounding a valley 44 is a presumption of the system 20 in a bimodal embodiment. Other embodiments of the system 20 may make different assumptions and/or presumptions relating to the attributes of the initial histogram 110.

The processes for identifying peaks 42 and valleys 44 are discussed below. The identification of the valley 44 can play an important part in identifying the magnitude by which pixel values 38 should be enhanced by the system 20.

B. Histogram Smoothing

Returning to FIG. 4, the system 20 can perform a histogram smoothing heuristic at 102. A variety of smoothing heuristics are known in the art. One example of a soothing heuristic is a one-dimensional Gaussian filter.

Figure 7:
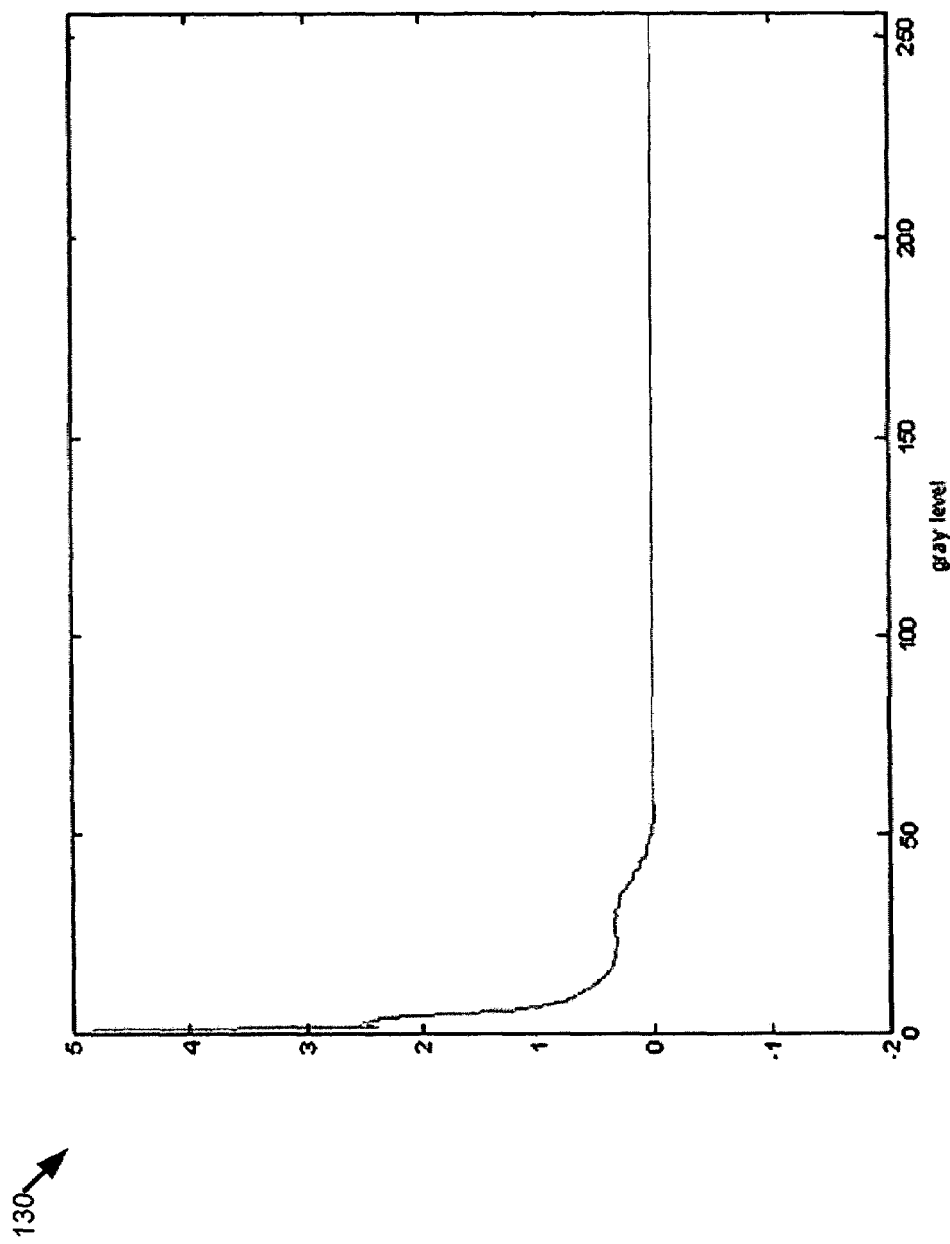
FIG. 7 is a histogram diagram illustrating an example of an initial histogram.

FIG. 7 is a histogram diagram illustrating an example of an initial histogram 130 that has been subject to the smoothing heuristic of a one-dimensional Gaussian filter.

C. Zero-Crossing Detection

At 104 of FIG. 4, the system 20 can identify the "zero-crossing" point of the histogram 40. This process involves creating a histogram derivative from the smoothed histogram, and then creating a quantized derivative diagram from the histogram derivative.

Figure 8:
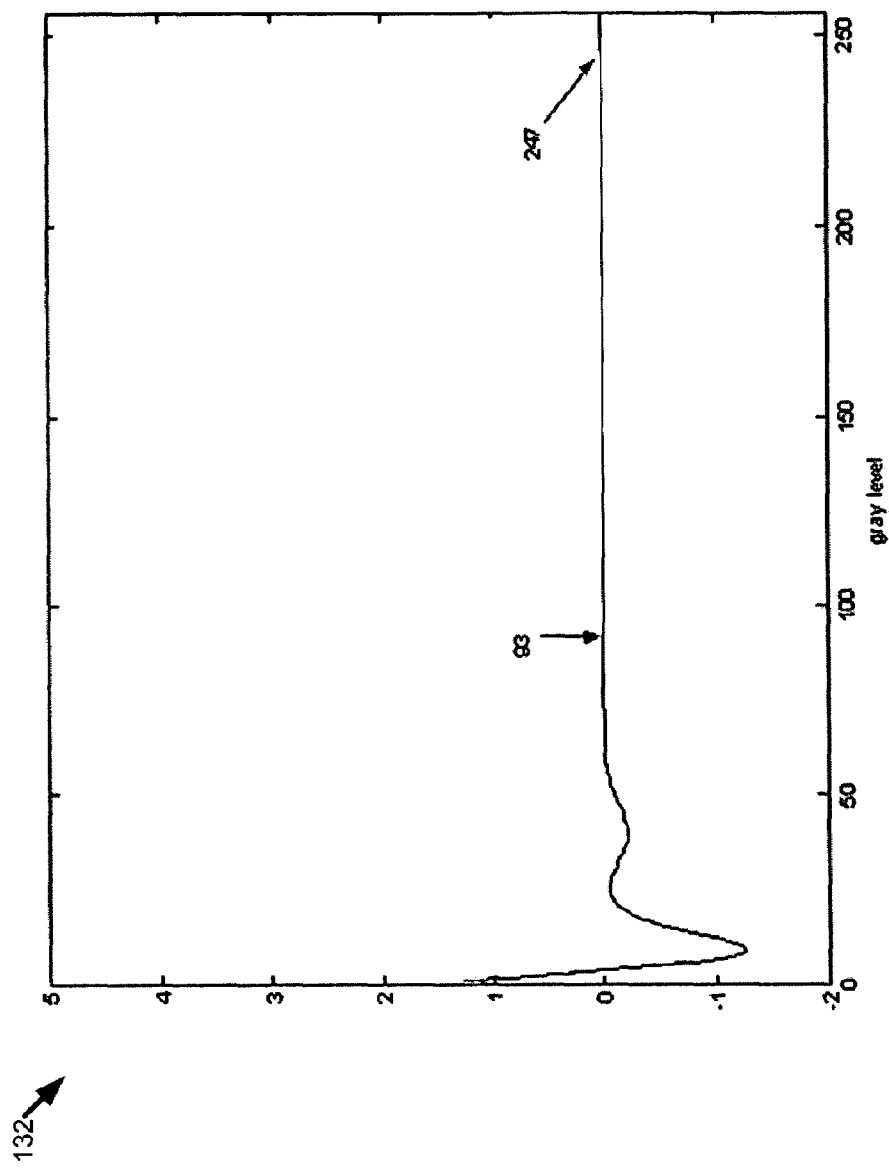
FIG. 8 is a diagram illustrating an example of a histogram derivative.
Figure 9:
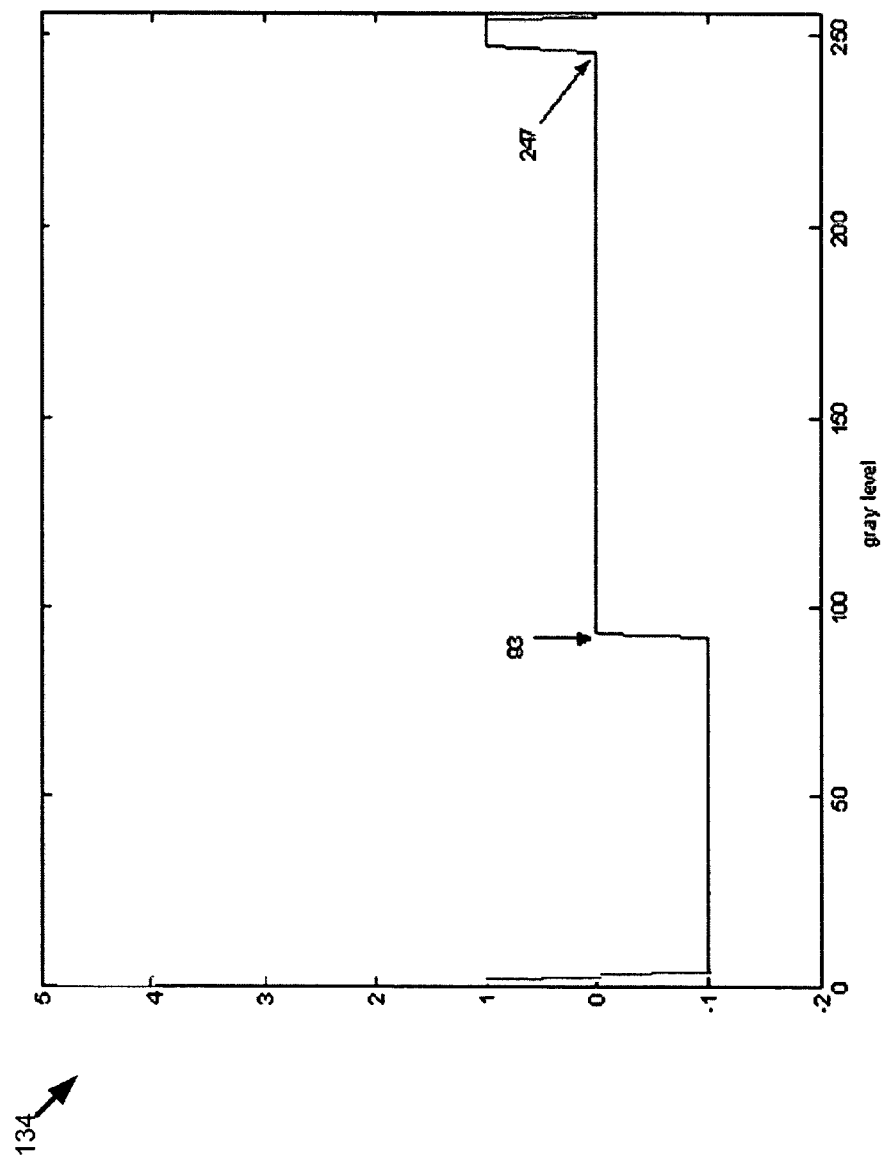
FIG. 9 is a diagram illustrating an example of a quantized histogram derivative.

A first order derivative can be computed from the smoothed histogram 130 of FIG. 7. An example of a first order derivative 132 is displayed in FIG. 8. The system 20 can then quantize the derivatives into three levels of −1, 0, and 1, and detect the zero-crossing points where the derivative decreases from 1 to −1. As illustrated in FIG. 9, the segment between pixel value 93 and pixel value 247 represents a zero-crossing "point" or segment.

D. Valley Detection

Returning to FIG. 4, a valley detection heuristic can be performed at 106. The zero-crossing point that has the maximum number of accumulating pixels 36 is identified as the valley 44.

In the example of FIG. 9, the zero-crossing point runs from the pixel value of 93 through the pixel value of 247. The valley threshold value is 93 because that is the lowest pixel value 38 in the valley.

E. Enhance Image

Returning to FIG. 4, the system 20 at 108 can create the enhanced image 24.

The enhanced image 24 can be created through the invocation of the stretching heuristic 46. The system 20 invokes the stretching heuristic to stretch out the narrow range of pixel values 38 in the initial image 22 (typically between 0 and approximately 50 gray or intensity level in a poor contrast environment) and "stretch" out the range of values to the full range of potential pixel values 38 (typically between 0 and 255 gray or intensity levels). The stretch metric 48 (which can also be referred to as an "intensity value") determines the magnitude of the stretch processing.

In some embodiments of the system 20, the stretch heuristic 46 is a linear stretch heuristic. In other embodiments, the stretch heuristic 46 can be a non-linear stretch heuristic.

One example of a linear stretch heuristic is provided in the equation below.

Stretch Metric=$G(x,y)$*maximum potential pixel value
Valley threshold value

In the equation, $G(x,y)$ represents the pixel value 38 of a particular pixel 36. The valley threshold value is identified and discussed above. The maximum potential pixel value is the highest possible pixel value 38 in the range of potential pixel values (typically running from 0 through 255).

A stretch metric 48 can be calculated for each pixel 36 to be "stretched" by the stretch heuristic 46.

The enhancement process at 108 can in some embodiments include the invocation of the suppression heuristic 50 that suppresses pixel values that are probably too high as the result of glare. For example, headlights on the highway can distort the appropriate contrast of the initial image 22. The pixel values 38 that are above a particular value can be suppressed by a predefined amount. For example, any pixel value 38 that exceeds (1) the valley threshold value; (2) the stretch metric; or (3) any other point of reference, can be reduced by a predefined percentage, such as between 5% and 25%. In many vehicle operation environments, pixel values 38 that exceed the valley threshold value are reduced by 10%. Other suppression heuristic values can be used to calculate or influence a pre-determined threshold pixel value 38.

The modified or "stretched" pixels 36 can then be reassembled into the enhanced image 24. The process in FIG. 4 can then repeat again for the next captured initial image 22.

V. Image Region Embodiments

In some embodiments of the system 20, the processing identified above with respect to the activated enhancement heuristic 99 (an example of which is provided in FIG. 4) is performed with respect to the individual image regions 52 within the initial image 22 instead of to the initial image 22 as a whole. In "image region" embodiments of the system 20, the initial image 22 is divided into a variety of image regions 52.

For example, the "global" contrast metric 30 would actually relate solely to a particular image region 52. Thus, each image region 52 could have its own: initial histogram 130, histogram derivative 132, quantized derivative 134, contrast metric 30, stretch metric 48, and suppression metric 51.

For each image region 52, the initial histogram 130 can be truncated according to a user supplied contrast factor and/or the average number of pixels 36 at each pixel value (e.g. gray or intensity level) 38. The surplus pixels 36 can be redistributed iteratively among all of the pixel values 38 (e.g. typically pixel values 0-255). This can allow the user to influence or even control how much the contrast within the initial image 22 is improved by the system 20. A larger contrast factor will result in greater contrast enhancement. The bilinear interpolation heuristic 56 can be invoked to smooth the entire image after the image regions 52 are reassembled into a single interim image 34.

In many embodiments of the system 20, it can be beneficial to use predefined sizes for the image regions 52 and predefined contrast factors. For example, it can be useful to divide the initial image 22 evenly into 8×8 image regions 52 along x and y directions. It can also be useful to set the contrast factor at 6.0. The image region size can vary based on the application or other contrast threshold-related factors A variety of different region identification heuristics 54 are known in the art, and can be used to divide up the initial image 22 into various image regions 52. Some of those heuristics 54 involve a dynamic process in which the number of regions 52 and the boundaries of those regions 52 differ with each initial image 22. In other embodiments, the number of regions 52 and the boundaries of those regions 52 are static and predefined.

VI. Process Flow View of Implementing the System

FIG. 10 is a flow chart diagram illustrating an example of an implementation heuristic 140 for implementing the system 20.

At 142, a user control is configured to modify a contrast threshold 32. In image region embodiments of the system 20, the user control could be used to modify the contrast factor and/or the contrast threshold 32. In certain embodiments of the system 20, the ability of an end user to modify the contrast threshold 32 and/or the contrast factor is constrained to a predefined range of values that are embedded into the system 20 in accordance with the design specification of the application utilizing the system 20. In other embodiments, no limits are placed on range of values from which the user can choose from.

At 144, an enhancement heuristic 28 is embedded into a device that is influenced by the user control device configured at 142. For example, the user controller and the computer 23 housing the enhancement heuristic 28 could be embedded into a vehicle. The system 20 could then be activated by an end user to obtain the functionality of image enhancement. In a night vision embodiment of the system 20 for use in a vehicle, the system 20 can function effectively with a sensor speed of approximately 30 frames per second on a computer with a processing speed of 3 GHz.

VII. Alternative Embodiments

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

The invention claimed is:

1. An image enhancement system that is configured to create an enhanced image from an initial image, comprising:
a computer integrated with a night vision device;
said computer providing for:
a contrast metric generated from an initial image taken under dark ambient lighting conditions;
an enhancement heuristic;
a contrast threshold; and
a comparison generated by comparing said contrast metric to said contrast threshold, wherein the activation of said enhancement heuristic is influenced by said comparison;
a plurality of pixel values that are influenced by said initial image taken under dark ambient lighting conditions;
a valley identified within said plurality of pixel values; and
a stretch metric identified using said contrast metric and said valley, wherein an enhanced image is generated using said stretch metric, such that said plurality of pixels of said initial image are stretched to enhance a contrast of said initial image taken under dark ambient lighting conditions to create said enhanced image based upon said stretch metric.

2. The system of claim 1, wherein said valley is identified using a Gaussian filter.

3. The system of claim 1, wherein said valley is identified using a smoothed histogram.

4. The system of claim 1, wherein said valley is identified between a first peak and a second peak.

5. The system of claim 1, wherein said valley is identified using a first order derivative.

6. The system of claim 1, wherein said valley is a zero-crossing point.

7. The system of claim 1, wherein said stretch metric is influenced by said contrast threshold.

8. The system of claim 1, wherein said contrast threshold is influenced by a user control.

9. The system of claim 1, wherein a suppression heuristic reduces a plurality of pixel values above said contrast threshold before said system generates said enhanced image.

10. The system of claim 1, further providing for a plurality of regions and a plurality of histograms, wherein the initial image is divided into a plurality of regions, and wherein each said region is associated with at least one said histogram.

11. The system of claim 1, wherein said system is located within a vehicle and operates in a substantially real-time manner.

* * * * *